(12) United States Patent
Hanaoka et al.

(10) Patent No.: US 7,990,838 B2
(45) Date of Patent: *Aug. 2, 2011

(54) PROCESS FOR PRODUCING STAMPER OF MULTI-VALUED ROM DISC, APPARATUS FOR PRODUCING THE SAME, AND RESULTING DISC

(75) Inventors: Katsunari Hanaoka, Atsugi (JP); Hiroshi Miura, Yamato (JP)

(73) Assignee: Ricoh Company, Ltd., Tokyo (JP)

( * ) Notice: Subject to any disclaimer, the term of this patent is extended or adjusted under 35 U.S.C. 154(b) by 1180 days.

This patent is subject to a terminal disclaimer.

(21) Appl. No.: 11/579,816

(22) PCT Filed: May 18, 2005

(86) PCT No.: PCT/JP2005/009499
§ 371 (c)(1),
(2), (4) Date: Mar. 7, 2007

(87) PCT Pub. No.: WO2005/112024
PCT Pub. Date: Nov. 24, 2005

(65) Prior Publication Data
US 2007/0217322 A1  Sep. 20, 2007

(30) Foreign Application Priority Data

May 18, 2004  (JP) .................................. 2004-148452

(51) Int. Cl.
*G11B 7/26* (2006.01)
(52) U.S. Cl. ....................................... 369/284; 430/321
(58) Field of Classification Search .................. None
See application file for complete search history.

(56) References Cited

U.S. PATENT DOCUMENTS

| 7,501,225 B2 * | 3/2009 | Miura ..................... 430/270.12 |
| 2005/0079313 A1 * | 4/2005 | Kim et al. .................... 428/64.4 |

FOREIGN PATENT DOCUMENTS

| JP | 2-64932 | | 3/1990 |
| JP | 08-235593 | * | 9/1996 |
| JP | 9-115190 | | 5/1997 |
| JP | 2642422 | | 5/1997 |
| JP | 10-97738 | | 4/1998 |
| JP | 2000-280255 | | 10/2000 |
| JP | 2001-250279 | | 9/2001 |

(Continued)

OTHER PUBLICATIONS

Kuwabara et al. translation 2002.*

*Primary Examiner* — Cynthia H Kelly
*Assistant Examiner* — Anna L Verderame
(74) *Attorney, Agent, or Firm* — Dickstein Shapiro LLP (57) ABSTRACT

The present invention provides a process for producing inexpensively and effectively a stamper utilized for producing multi-valued ROM discs, which comprises:
(i) irradiating a light onto a laminate, thereby producing reacted portions within a thermo reactive layer,
(ii) maintaining the reacted portions, which are produced by irradiating the light, within the thermo reactive layer,
(iii) maintaining an optical absorption layer under the reacted portions,
(iv) maintaining a substrate under the reacted portions, and
(v) removing the maintained optical absorption layer and the maintained thermo reactive layer,
wherein the laminate comprises the optical absorption layer and the thermo reactive layer on the substrate, the optical absorption layer and the thermo reactive layer are disposed adjacently.

19 Claims, 6 Drawing Sheets

FOREIGN PATENT DOCUMENTS

| | | |
|---|---|---|
| JP | 2001-250280 | 9/2001 |
| JP | 2001-256646 | 9/2001 |
| JP | 2002-184045 | 6/2002 |
| JP | 2002-365806 | 12/2002 |
| JP | 2003-85776 | 3/2003 |
| JP | 2003-145941 | 5/2003 |
| JP | 2003-272249 | 9/2003 |
| JP | 2004-348830 | 12/2004 |
| JP | 2005-11489 | 1/2005 |
| JP | 2005-100602 | 4/2005 |

\* cited by examiner

PROCESS FOR PRODUCING STAMPER OF MULTI-VALUED ROM DISC, APPARATUS FOR PRODUCING THE SAME, AND RESULTING DISC

TECHNICAL FIELD

The present invention relates to processes for producing stampers that are utilized for producing multi-valued ROM discs, apparatuses for producing stampers that are utilized for producing multi-valued ROM discs, and the resulting multi-valued ROM discs.

BACKGROUND ART

In optical discs, two-valued data are typically recorded into spiral or concentric tracks by various means; for example, convex-concave pits are formed by embossing into ROM discs, pores are formed into inorganic or organic recording membranes of recordable discs, and different crystal phases are formed into phase change discs. When recorded data are regenerated from optical discs, laser beams are irradiated to the tracks, the intensities of reflected light are detected, and regenerating signals are obtained. From the regenerating signals, two-valued data are generated through determining them by certain threshold values, for example.

The ROM discs such as CD, CD-ROM, and DVD-ROM discs are typically mass-produced inexpensively by transferring the convex-concave pits of stampers onto a resin plate. The convex-concave pits of stampers are typically produced, for example, by forming a resist pattern on a glass substrate, irradiating a laser beam onto the substrate to form a latent image, and developing the latent image.

Further, recordable discs or phase change discs such as CD-R, CD-RW, DVD-R, and DVD+RW are typically produced by transferring guide grooves for tracking etc. from stampers onto a resin plate, on which recording materials such as inorganic or organic recording membranes are applied, and information is recorded by means of reading-writing devices such as CD-R drives.

As for these optical discs or information recording media, there exist continuous needs to increase the recording capacity.

One way to increase the recording capacity of such information recording media is to decrease the size of guide grooves, pits, etc. However, focal diameter of laser beam typically depends on wavelength of the laser beam and numerical aperture (hereinafter referring to as "NA") of the collecting lens; therefore, practical limits are considered as 405 nm of wavelength and 0.85 of NA, currently. For example, when NA is as high as 0.85, the distance between the pickup and the substrate becomes inevitably shorter, thus various troubles or adverse effects will occur due to collision of the pickup and the substrate or dusts, for example. For these reasons, NA of popular lenses utilized in DVD drives is usually 0.65, which will also exclude exchanges into higher NA from commercial reasons.

Figure 1:
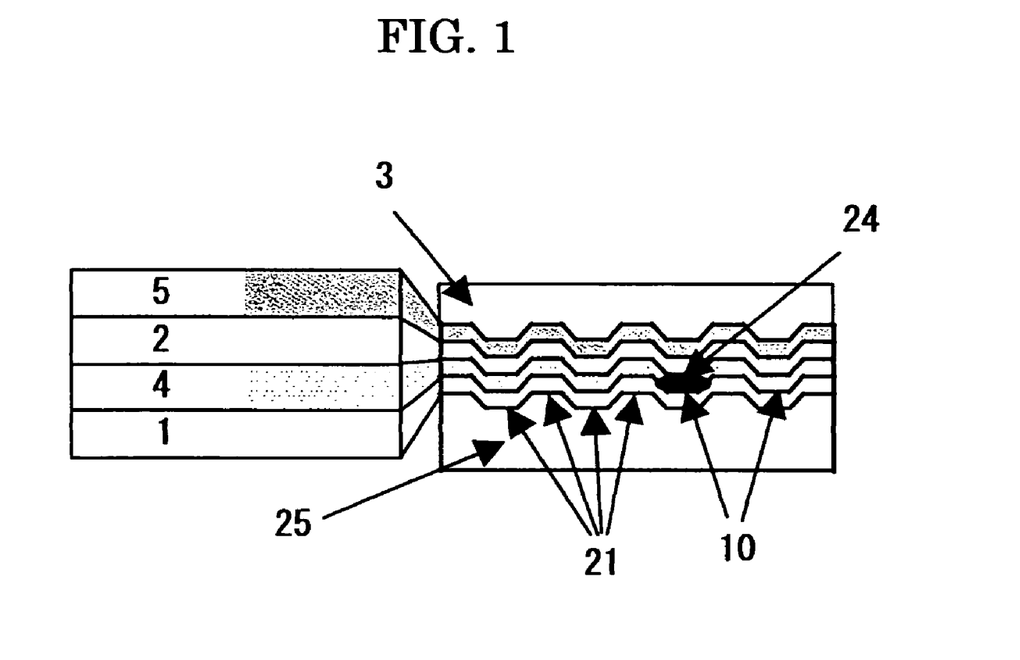
FIG. 1 is a schematic view that explains the concept in terms of the multi-valued recording disclosed in Japanese Patent No. 2642422.
Figure 2:
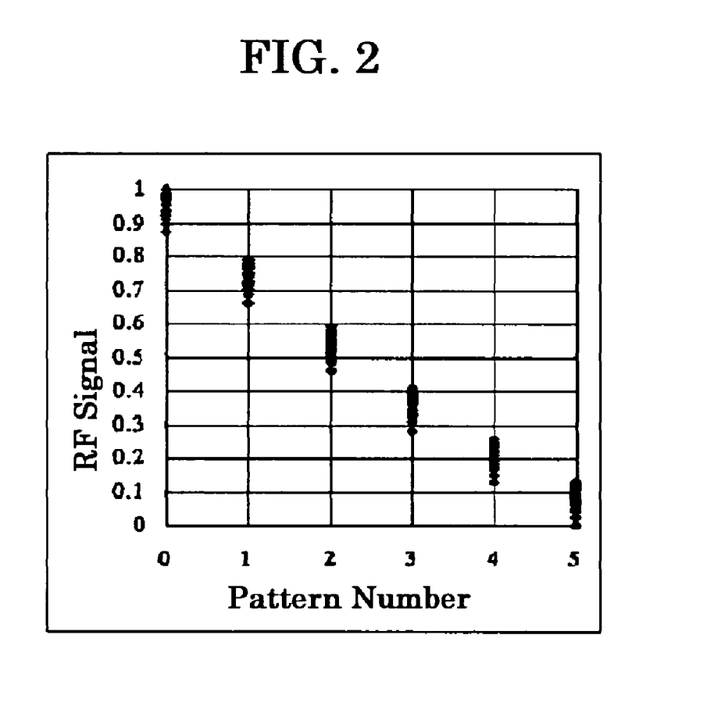
FIG. 2 is a schematic view that shows an exemplary relation between pattern numbers and RF signals utilized in multi-valued recording.

Another way to increase the recording capacity of such information recording media is to utilize multi-valued recording of three or more values in place of two-valued recording. For example, Patent Literature 1 discloses six-valued recording in one recording bit by altering the recording bit size of the phase change disc. FIG. 1 shows the model of the phase change disc. An image recording medium is prepared by forming recording material, reflective layer 5, and protective layers 1, 2, 3 on PC substrate 25 to which track 21 is formed. Laser beam is irradiated to the information recording medium to form recording bits 24. As shown in FIG. 1, recording bits 24 are is formed in a condition that one recording bit is formed per every certain area, as one cell for one recording bit, within groove 10 and the size of the recording bits are altered under certain rule. When the recorded information is regenerated from the image recording medium, the reflective optical quantities vary depending on the size of recording bits 24, RF signals are converted to levels in accordance with the reflective optical quantities, and information is regenerated. In such case, since values of 0 to 5 can be expressed by one cell, much information can be recorded compared to the conventional value of 0 and 1.

In order to increase the recording capacity by the multi-valued recording to a level higher than two-valued recording, the size of the recording pots should be decreased. When information of 25 GB is to be recorded by multi-valued recording in an optical disc of CD size, the length of unit cell is 250 nm or less and the diameter of the smallest pit is about 100 nm or less, in order to assure the dynamic range.

In general, stampers for producing optical discs are produced by exposing by means of a photoresist and laser beam, patterning of the resist by developing, and then etching of a substrate using the patterned resist as a mask. In the process for producing stampers, exposing by means of electron beam is a candidate for forming pits of about 100 nm in place of the laser beam.

However, resists are generally insufficient in sensitivity toward electron beam; and the processing capacity is inevitably lower since processing in vacuum atmosphere is necessary. Further, the utilization of electron beam suffers from hard maintenance, higher running cost compared to the laser beam process, and additionally higher process cost due to lower processing capacity.

On the other hand, the improvement of laser beam process is also expected for forming more fine patterns while avoiding possible higher cost described above.

Patent Literature 2 discloses a process for producing a stamper in which a laser beam is irradiated onto a phase change membrane such as of GeSn to crystallize the membrane in part, removing amorphous portions by etching, thereby forming a convex-concave pattern or structure.

Patent Literature 3 discloses a process for producing a stamper in which laser beam is irradiated to a chalcogen compound such as GeSbTeSn to crystallize the compound in part, removing amorphous portions by etching, thereby forming a convex-concave pattern or structure.

In order to achieve proper uniformity in structures having larger surface area such as optical discs, the remaining portions and the removing portions should represent significant difference between their etching rates or selectivities. The difference of etching rate or selectivity is generally not significant between crystalline and amorphous states in phase change materials. In some cases, an intermediate state between crystalline and amorphous appears in phase change materials. Accordingly, the processes disclosed in Patent Literatures 1 and 2 are considered inappropriate for achieving sufficient uniformity in structures having larger surface area.

Patent Literatures 4 and 5 disclose processes for producing a convex-concave pattern or structure by irradiating laser beam onto a thermosensitive material, which is formed by laminating two metal materials such as Al and Cu, thereby forming reacted portions of alloy through interdiffusion of two metal materials, and removing the unreacted portions by etching to produce a convex-concave pattern or structure.

Patent Literature 6 discloses a process for producing a convex-concave pattern or structure by irradiating laser beam onto a laminate of two inorganic materials such as Au and Sn, thereby forming reacted portions of alloy through interdiffusion of two metal materials, then removing the unreacted portions by etching to produce a convex-concave pattern or structure.

However, these processes are considered inappropriate for achieving sufficient uniformity in structures having larger surface area, since the distribution of two materials remains in the thickness direction, which tends to bring about a significant distribution in the thickness direction and a nonuniform etching rate.

Patent Literature 7 discloses a process for producing a convex-concave pattern or structure by irradiating laser beam onto a laminate formed of an optically absorptive and thermally exchangeable layer such as of GeSbTe and thermosensitive layer of chemically amplified resist for photolithography thereby to modify the thermosensitive layer, then removing the unmodified portions by etching to produce a convex-concave pattern or structure.

However, optically absorptive materials are generally inappropriate for producing convex-concave patterns or structures having a higher aspect ratio of pattern height to structure size, since the layer for the pattern or structure is necessarily thickened to obtain a higher aspect ratio, which leads to higher thermal diffusion in the layer and disturbance against fine and precise patterning.

Patent Literature 1: Japanese Patent No. 2642422
Patent Literature 2: Japanese Patent Application Laid-Open (JP-A) No. 09-115190
Patent Literature 3: JP-A No. 10-97738
Patent Literature 4: JP-A No. 2001-250279
Patent Literature 5: JP-A No. 2001-250280
Patent Literature 6: JP-A No. 2003-145941
Patent Literature 7: JP-A No. 2002-365806

DISCLOSURE OF INVENTION

The objects of the present invention are to provide processes for producing stampers that are utilized for producing multi-valued ROM discs inexpensively, apparatuses for producing stampers that are utilized for producing multi-valued ROM discs, and the resulting multi-valued ROM discs.

In addition, the objects of-the present invention are to produce stampers of multi-valued ROM discs inexpensively and efficiently owing to employing wet etching methods rather than vacuum methods; to produce stampers of multi-valued ROM discs on substrates with higher dimensional accuracy owing to employing dry etching methods; to form fine patterns of reacted portions with high dimensional accuracy owing to disposing a thermo reactive layer as an uppermost layer of a laminate and irradiating a laser beam toward the thermo reactive layer as the uppermost layer; to form fine patterns of reacted portions on laminates having larger surface area with high dimensional accuracy owing to employing certain material into a thermo reactive layer; and to provide processes for producing stampers that are utilized for producing multi-valued ROM discs inexpensively owing to employing a semiconductor laser for the laser source.

These objects may be attained by the process for producing a stamper according to the present invention, which comprises irradiating a light onto a laminate, causing a reaction due to the irradiation, and forming a pattern of the stamper, wherein the laminate comprises an optical absorption layer and a thermo reactive layer on a substrate, the optical absorption layer and the thermo reactive layer are disposed adjacently, the reaction is induced within the thermo reactive layer, thereby producing a pattern of reacted portions from the thermo reactive layer, the pattern of the stamper is formed by making use of the pattern of the reacted portions, and the stamper is utilized for producing multi-valued ROM discs.

Preferably, the pattern of the stamper is formed by developing which makes use of the difference of etching rate between the reacted portions and unreacted portions of the thermo sensitive layer.

These objects may be attained by the process for producing a stamper of according to the present invention of another aspect, which comprises:

(i) irradiating a light onto a laminate, thereby producing reacted portions within a thermo reactive layer, (ii) maintaining the reacted portions, which are produced by irradiating the light, within the thermo reactive layer, (iii) maintaining an optical absorption layer under the reacted portions, (iv) maintaining a substrate under the reacted portions, and (v) removing the maintained optical absorption layer and the maintained thermo reactive layer, wherein the laminate comprises the optical absorption layer and the thermo reactive layer on the substrate, the optical absorption layer and the thermo reactive layer are disposed adjacently, and the stamper is utilized for producing multi-valued ROM discs.

In accordance with the processes for producing a stamper described above, since fine pits can be formed by optical energy and developing without electron beam, stampers for multi-valued ROM discs can be produced inexpensively. In particular, the laminate configuration of the optical absorption layer and the thermo reactive layer being separated on the substrate can make thinner the layer capable of absorbing optical energy and generating thermal energy, and the laminate configuration of thinned layers can suppress the thermal diffusion, thereby resulting in reacted portions with fine and precise dimension.

Preferably, the light for irradiating the laminate is a laser beam; and the laser source of the laser beam is a semiconductor laser source. Such a laser beam may provide efficient optical energy and also fine and precise irradiation, thus may lead to lower production cost and also fine and precise pits.

Preferably, the maintaining of the reacted portions within the thermo reactive layer is performed by a wet etching method. Such a wet etching method may lead to inexpensive and efficient production of stampers compared to vacuum methods.

Preferably, the maintaining of the optical absorption layer is performed by a dry etching method; and the maintaining of the substrate is performed by a dry etching method. Such a dry etching method may provide stampers with high dimensional accuracy.

Preferably, the removing of the maintained optical absorption layer and the maintained thermo reactive layer is performed by a wet etching method. Such a wet etching method may lead to inexpensive and efficient production of stampers compared to vacuum methods.

Preferably, the thermo reactive layer is transparent to the irradiated light. The transparency of the thermo reactive layer may suppress the optical absorption at the thermo reactive layer, and the reacted portions may be formed due to the heat generated exclusively at the optical absorption layer, thus the reacted portions may represent high dimensional accuracy.

Preferably, the thermo reactive layer is the uppermost layer of the laminate; and the light is irradiated toward the thermo reactive layer. Such construction may allow higher NA of the objective lens and the laser beam can be effectively collected; therefore, the reacted portions can be finely processed.

Preferably, the thermo reactive layer comprises a mixture of material A and material B, the material A comprises silicon oxide, and the material B comprises a compound selected from sulfide compounds, selenide compounds, and fluoride compounds. Such a mixture of material A and material B may lead to a higher etching depth ratio between irradiated portions and non-irradiated portions, resulting in fine reacted portions uniformly distributed over a large area. Further, the materials A and B may be easily thickened owing to the constituent compounds, therefore, the reacted portions may be formed into higher aspect ratio of (column height)÷(column diameter).

In another aspect of the present invention, apparatuses for producing a stamper of multi-valued ROM discs may be provided, and the processes described above produce the stamper.

In still another aspect of the present invention, multi-valued ROM discs may be provided, and the processes described above produce the multi-valued ROM discs.

BRIEF DESCRIPTION OF DRAWINGS

FIG. 4D-A is a schematic cross section that exemplarily illustrates an electroforming step for producing a stamper of multi-valued ROM discs according to the present invention.

FIG. 4D-B is a schematic cross section that exemplarily illustrates a substrate-pattern forming step for producing a stamper of multi-valued ROM discs according to the present invention.

FIG. 4D-C is a schematic cross section that exemplarily illustrates a mask-removing step for producing a stamper of multi-valued ROM discs according to the present invention.

FIG. 4D-D is a schematic cross section that exemplarily illustrates an electroforming step for producing a stamper of multi-valued ROM discs according to the present invention.

BEST MODE FOR CARRYING OUT THE INVENTION

In the first aspect of the present invention, the process for producing a stamper utilizes a laminate that comprises an optical absorption layer and a thermo reactive layer on a substrate, and the optical absorption layer and the thermo reactive layer are disposed adjacently. The optical absorption layer performs to absorb optical energy and to generate thermal energy or heat; and the thermo reactive layer performs thermal reaction owing to the heat from the optical absorption layer; as a result, a pattern is formed by making use of the reacted portions within the thermo reactive layer produced by irradiating the optical absorption layer, thereby producing a stamper that is utilized for producing multi-valued ROM discs.

Preferably, the pattern of the stamper is formed by developing which makes use of the difference of etching rate between the reacted portions and unreacted portions of the thermo sensitive layer.

In the second aspect of the present invention, the process for producing a stamper utilizes a laminate that comprises an optical absorption layer and a thermo reactive layer on a substrate, and the optical absorption layer and the thermo reactive layer are disposed adjacently. The process of the second aspect comprises the following steps in order:
 (i) irradiating a light onto a laminate, thereby producing reacted portions within a thermo reactive layer,
 (ii) maintaining the reacted portions, which are produced by irradiating the light, within the thermo reactive layer,
 (iii) maintaining an optical absorption layer under the reacted portions,
 (iv) maintaining a substrate under the reacted portions, and
 (v) removing the maintained optical absorption layer and the maintained thermo reactive layer.

Figure 3A:
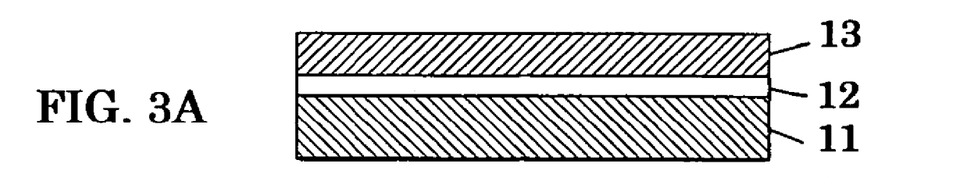
FIG. 3A is a schematic cross section that illustrates an exemplary laminate configuration utilized in a process for producing a stamper of multi-valued ROM discs according to the present invention.
Figure 3B:
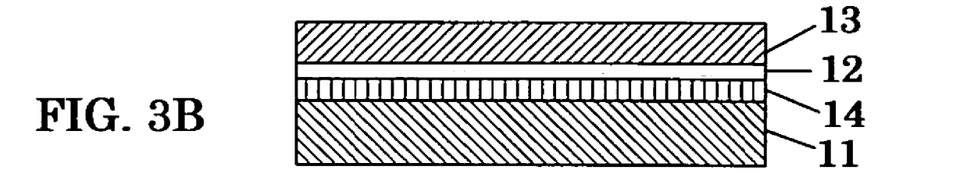
FIG. 3B is another schematic cross section that illustrates an exemplary laminate configuration utilized in a process for producing a stamper of multi-valued ROM discs according to the present invention.
Figure 3C:
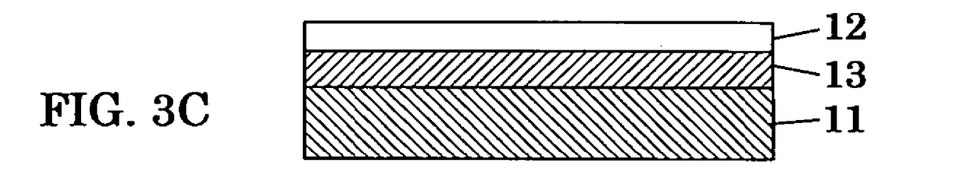
FIG. 3C is another schematic cross section that illustrates an exemplary laminate configuration utilized in a process for producing a stamper of multi-valued ROM discs according to the present invention.

The laminate configuration may be properly selected without particular limitations as long as the laminate contains an overlapped configuration of an optical absorption layer and a thermo reactive layer on a substrate. For example, the laminate configuration may be as follows:

Configuration 1: substrate 11, optical absorption layer 12, and thermo reactive layer 13 as shown in FIG. 3A;

Configuration 2: substrate 11, protective layer 14, optical absorption layer 12, and thermo reactive layer 13 as shown in FIG. 3B; the material of protective layer 14 may be the same as that of thermo reactive layer 13;

Configuration 3: substrate 11, thermo reactive layer 13, and optical absorption layer 12 as shown in FIG. 3C.

-Thermo Reactive Layer-

The material of the thermo reactive layer may be properly selected without particular limitations as long as the material can undergo thermal alteration due to the heat from the optical absorption layer; preferably, the material is of lower density or amorphous in the laminated condition. Examples of the materials of the thermo reactive layer include silicon compounds, sulfide compounds, selenide compounds, and fluoride compounds.

Specific examples of the silicon compounds include $SiO_2$, SiON, and SiN. The materials of these compounds can alter their densities due to the heat, from the optical absorption layer, that is generated from optical energy such as laser irradiation, and can be densified at the irradiated portions; consequently, the irradiated portions can be arranged into the reacted portions.

Specific examples of the sulfide compounds include ZnS, CaS, and BaS. The materials of these compounds can alter their densities due to the heat from the optical absorption layer and can be densified at the irradiated portions. Further, sulfur atoms can dissociate at the irradiated portions where the material composition alters. In etching step, the etching rate at the irradiated portions decreases due to the densification and the composition alteration; consequently, the irradiated portions can leave the configuration as the pattern or structure.

Specific examples of the selenide compounds include ZnSe and BaSe. The materials of these compounds can alter their density due to the heat from the optical absorption layer and can be densified at the irradiated portions. Further, selenium atoms can dissociate at the irradiated portions where the material composition alters. In etching step, the etching rate at the irradiated portions decreases due to the densification and the composition alteration; consequently, the irradiated portions can leave the configuration as the pattern or structure.

Specific examples of the fluoride compounds include $CaF_2$ and $BaF_2$. The materials of these compounds can alter their densities due to the heat from the optical absorption layer and can be densified at the irradiated portions. Further, fluorine atoms dissociate at the irradiated portions where the material composition alters. In etching step, the etching rate at the irradiated portions decreases due to the densification and the composition alteration; consequently, the irradiated portions can leave the configuration as the pattern or structure.

Preferably, the material of the thermo reactive layer is of higher transmittivity at the wavelength of irradiated laser. Preferably, the light absorption is $1 \times 10^{-3}$ to $1 \times 10^{-5}$ at the wavelength of irradiated laser. Specific examples of these materials having a higher transmittivity include silicon compounds such as $SiO_2$, SiON, and SiN; sulfide compounds such as ZnS, CaS, and BaS; selenide compounds such as ZnSe and BaSe; and fluoride compounds such as $CaF_2$ and $BaF_2$. The materials with a higher transmittivity may suppress the optical absorption at the thermo reactive layer, and the reacted portions may be formed exclusively owing to heat from the optical absorption layer, therefore, the reacted portions may be processed finely and precisely.

Preferably, the thermo reactive layer is situated as the uppermost layer of the laminate configuration, and the laser beam is irradiated in the direction toward the thermo reactive layer. A thermosensitive layer may be employed as the substrate-protection layer, in which case the reacted portions are formed at the thermo reactive layer disposed at upper and lower sides of the optical absorption layer.

Figure 4A:
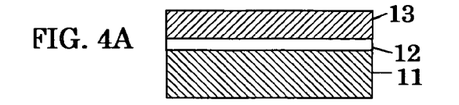
FIG. 4A is a schematic cross section that exemplarily illustrates a laminating step for producing a stamper of multi-valued ROM discs according to the present invention.

When a stamper of multi-valued ROM discs is produced in an electroforming method as shown in FIG. 4D-A, the thickness of the thermo reactive layer corresponds to the depth of ROM pit; therefore, the thickness of the thermo reactive layer is controlled by the depth of ROM pit.

Preferably, the thermo reactive layer comprises a mixture of material A and material B. The material A is of silicon oxide, and the material B is preferably of at least a compound selected from sulfide compounds, selenide compounds, and fluoride compounds.

Examples of the silicon oxide of material A include $SiO_2$ and SiON. Examples of the sulfide compound of material B include ZnS, CaS, and BaS; examples of the selenide compound of material B include ZnSe and BaSe; and examples of the fluoride compound of material B include $CaF_2$ and $BaF_2$.

The materials A and B may be of one compound or of no less than two compounds.

Preferably, the mixing ratio of materials A and B is 10 to 30 mole % of material A and 90 to 70 mole % of material B. Preferably, materials A and B exist independently without chemical bond between them.

When material A is of a silicon oxide, the mixed material of materials A and B may yield a thin film with lower density, which may be densified at the irradiated portions by the heat generation at the optical absorption layer due to irradiation of laser beam. The densification may bring about significant difference of densities between the irradiated and non-irradiated portions, which may lead to larger etching depth ratio. Dissociation of constituent elements occurs at the irradiated portions of material B; sulfur atoms dissociate from sulfide compounds, selenium atoms dissociate from selenide compounds; and fluorine atoms dissociate from fluoride compounds. Owing to the dissociation of atoms, material B alters the composition, which may also increase the etching depth ratio. Namely, both of the densification of material and the alteration of the composition may increase the etching depth ratio; therefore, fine reacted portions may be uniformly formed within the laminate with larger area. In addition, since films may be formed with lower density, thicker films may be formed with lower residual stress; since thermo reactive layer may be formed into thicker film for reacted portions, the reacted portions may be formed with higher aspect ratio of (height of reacted portion)÷(size of reacted portion).

The thickness of the thermo reactive layer corresponds to the height of columns to be maintained. Accordingly, the thickness of the thermo reactive layer corresponds to the depth of ROM pits, when multi-valued ROM discs are produced by way of electroforming a pattern of thermo reactive layer. Preferably, the thickness of the thermo reactive layer is 5 to 30 nm. When the thickness is below 5 nm, the thermo reactive layer may be deficient in continuous uniformity, and when the thickness is above 30 nm, the thermal capacity may be excessively large for fine patterns.

-Optical Absorption Layer-

The material of optical absorption layers may be properly selected without particular limitations as long as the material can absorb optical energy and generate thermal energy. Examples of the material of optical absorption layers include semiconductive materials such as Si, Ge, and GaAs; intermetallic compounds, containing a metal of lower melting point e.g. Bi, Ga, In, and Sn, such as BiTe, BiIn, GaSb, GaP, InP, InSb, InTe, and SnSb; carbides such as SiC; oxides such as $V_2O_5$, $Cr_2O_3$, $Mn_3O_4$, $Fe_2O_3$, $Co_3O_4$, and CuO; nitrides such as AlN and GaN; binary phase change materials such as SbTe; ternary phase change materials such as GeSbTe, InSbTe, BiSbTe, and GaSbTe; and quarternary phase change materials such as AgInSbTe.

Preferably, the thickness of the optical absorption layer is 3 to 20 nm. Thinner filming of the optical absorption layers may suppress thermal diffusion in the layer and lead to fine reacted portions.

-Substrate-

The substrate may be properly selected without particular limitations in terms of the shape, structure, size, etc. The shape may be of disc, card, etc. The shape should be determined such that the mechanical strength of the material can be maintained. In the case that the laser beam for recording and regenerating enters through the substrate, the substrate should be sufficiently transparent at the wavelength of the laser beam.

The material of the substrate may be inorganic materials such as glass, quartz, Si, Silicon on insulator, Al, and opaque glass; and organic materials such as polycarbonate resins, acrylic resins, polyolefin resins, epoxy resins, vinyl ester resins, polyethylene terephthalate resins, and UV curable resins.

The thickness of the substrate may be properly selected depending on the application; the thickness is preferably 0.1 to 5 mm, more preferably is 0.3 to 2 mm.

-Process for Producing Stamper of Multi-valued ROM Discs-

Figure 7A:
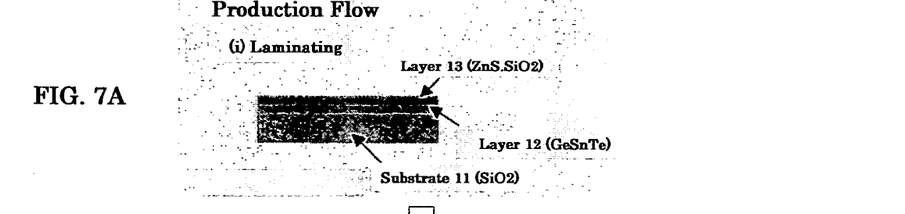
FIG. 7A is a schematic cross section that exemplarily illustrates a laminating step for producing a stamper of multi-valued ROM discs according to the present invention.
Figure 7B:
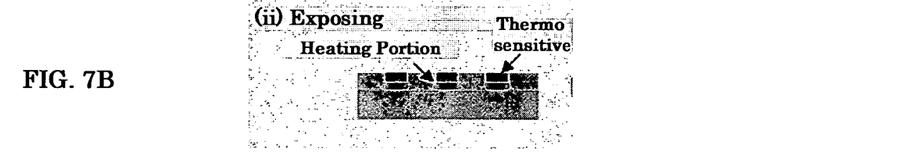
FIG. 7B is a schematic cross section that exemplarily illustrates an exposing step for producing a stamper of multi-valued ROM discs according to the present invention.

The inventive process for producing a stamper of multi-valued ROM discs will be explained with reference to FIGS. 7 and 8. Initially, an optical absorption layer and a thermo reactive layer are laminated on a substrate to form a laminate by laminating step as shown in FIG. 7A. Then, optical energy such as of laser beam is irradiated on the laminate to form reacted portions within the thermo reactive layer by exposing step as shown in FIG. 7B; the reacted portions within the thermo reactive layer are maintained by developing step as shown in FIG. 7C; the optical absorption layer under the reacted portions is maintained by etching step 1 as shown in FIG. 7D; the substrate under the reacted portions is maintained by etching step 2 as shown in FIG. 7E; and finally, the remaining optical absorption layer and the thermo reactive layer are removed by removing step of inorganic resist.

Figure 7C:
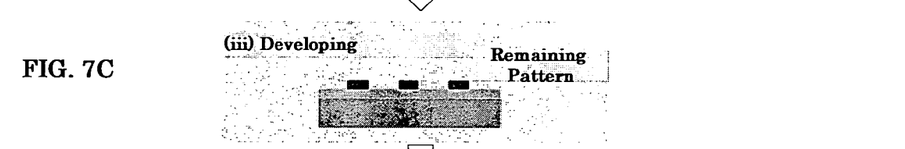
FIG. 7C is a schematic cross section that exemplarily illustrates an developing step for producing a stamper of multi-valued ROM discs according to the present invention.
Figure 7D:
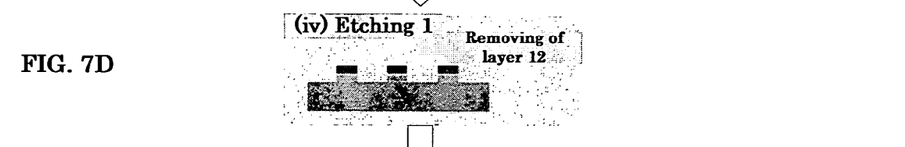
FIG. 7D is a schematic cross section that exemplarily illustrates a first etching step for producing a stamper of multi-valued ROM discs according to the present invention.
Figure 7E:
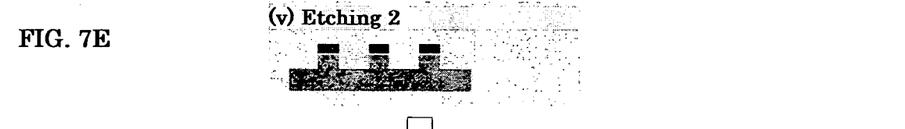
FIG. 7E is a schematic cross section that exemplarily illustrates a second etching step for producing a stamper of multi-valued ROM discs according to the present invention.
Figure 7F:
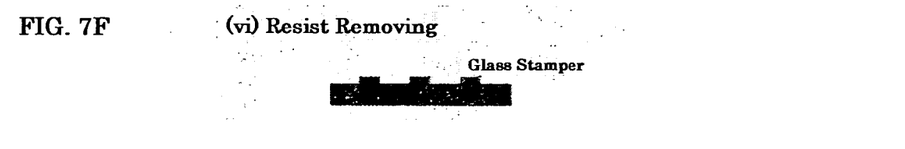
FIG. 7F is a schematic cross section that exemplarily illustrates an inorganic-resist-removing step for producing a stamper of multi-valued ROM discs according to the present invention.
Figure 8:
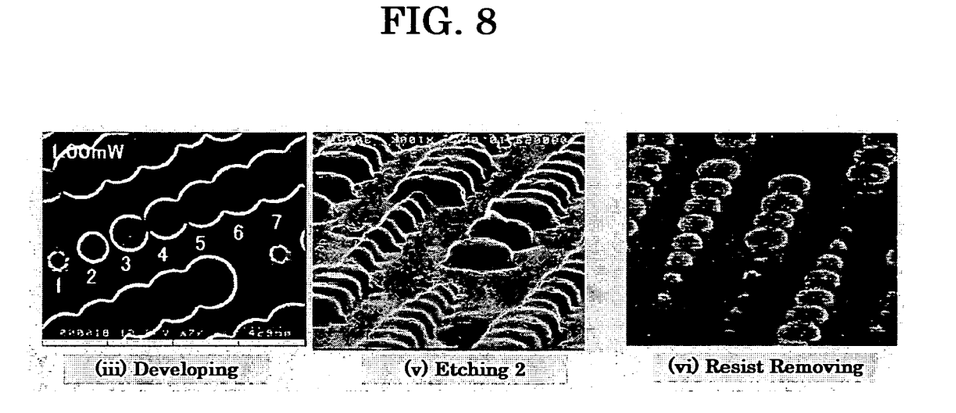
FIG. 8 schematically shows SEM photographs of surface condition of the laminate corresponding to FIGS. 7C, 7E, and 7F.

The surface conditions of the laminate are shown in FIG. 8 at the developing step corresponding to FIG. 7C, at the etching step 2 corresponding to FIG. 7E, and at the removing step of inorganic resist corresponding to FIG. 7F.

Another process for producing a stamper of multi-valued ROM discs will be explained with reference to FIG. 4A to FIG. 4D-D. The laminating step to the developing step are similar to those of FIGS. 7A to 7C; then the remaining reacted portions are transferred by electroforming step to form a stamper, a pattern is produced on a substrate by etching step using the reacted portions as a mask, or the pattern produced on the substrate is utilized as a mold to transfer another medium by electroforming to form a stamper. The same reference numbers in FIGS. 7A to 7F with those of FIGS. 3A to 3C indicate the same part or material.

Figure 4B:
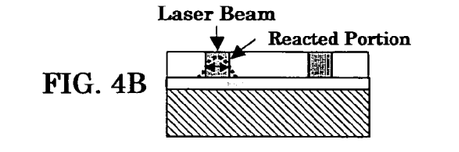
FIG. 4B is a schematic cross section that exemplarily illustrates a laser irradiating step for producing a stamper of multi-valued ROM discs according to the present invention.
Figure 4C:
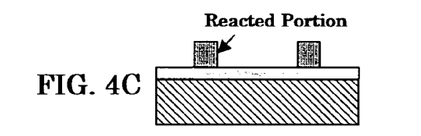
FIG. 4C is a schematic cross section that exemplarily illustrates a developing step for producing a stamper of multi-valued ROM discs according to the present invention.
Figure 4D:
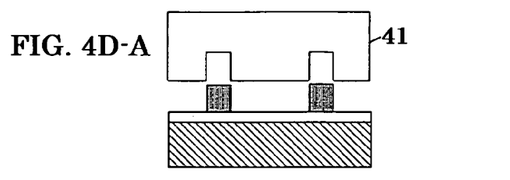

FIG. 4A to FIG. 4D-D exemplarily show a process for producing a stamper using the laminate of FIG. 3A and laser beam. FIG. 4A shows a laminating step, FIG. 4B shows a laser irradiating step, FIG. 4C shows a developing step, FIG. 4D-A shows an electroforming step, FIG. 4D-B shows a substrate-pattern forming step, FIG. 4D-C shows a mask-removing step, and FIG. 4D-D is a schematic cross section that exemplarily illustrates an electroforming step.

The respective steps are as follows. In the laminating step shown in FIG. 4A, a laminate is formed by laminating an optical absorption layer and a thermo reactive layer on a substrate. The method for forming a thin film may be selected from physical vapor deposition methods, chemical vapor deposition methods, other vapor deposition methods such as cluster ion beam methods, and laser abrasion methods.

FIG. 4B illustrates a laser irradiating step, which shows the irradiated condition. In the step, laser beam is irradiated onto certain sites of laminate disposed on a substrate. When the laser beam is irradiated, the laser source may be moved, the laminate may be moved, or both of the laser source and the laminate may be moved.

The laser source may be a $F_2$ laser having a wavelength of about 157 nm, ArF laser having a wavelength of about 193 nm, KrF laser having a wavelength of about 248 nm, or blue laser having a wavelength of about 400 nm that is commercially utilized for producing stampers of DVD-ROM.

The atmosphere at irradiating laser beam may be atmospheric air; or the atmosphere may be $N_2$, $O_2$, steam, argon, $H_2$, or the like by way of disposing the laminate within a closed container and flowing a specific gas into the container. Alternatively, the laser beam may be irradiated within vacuum atmosphere by way of disposing the laminate within a vacuum vessel.

In irradiating laser beam onto the laminate, pulse irradiation usually leads to a column shape of reacted portions in the thermo reactive layer. Longer pulse period usually leads to an elliptic column shape with the major axis in the laser scanning direction. The shape of the reacted portions may be formed into a column with an optional diameter owing to modulating the irradiated laser power and the irradiated pulse length, although the specific conditions are different due to the laminate configuration and the wavelength of the laser beam. The possible minimum diameter is about one-fifth of the laser beam diameter. For example, a column of 80 nm can be formed by means of the laser irradiating apparatus of wavelength 400 nm, NA 0.9, and beam diameter 0.4 µm.

FIG. 4C shows the developing step, in which the reacted portions of the thermo reactive layer remain after developing. The developing is performed by making use of the difference of etching rates between the reacted portions and unreacted portions of the thermo reactive layer after irradiating laser beam. By dipping the laminate into a developer after irradiating laser beam in the laser irradiating step, reacted portions with a column shape, for example, may be maintained. The developing may be carried out in vacuum atmosphere instead of dipping into a developer.

FIG. 4D-A shows an electroforming step, in which reacted portions remaining after the developing step shown in FIG. 4C are electroformed to prepare a stamper 41 of multi-valued ROM discs. In the electroforming, the height of the reacted portions corresponds to the depth of the ROM pits.

FIG. 4D-B shows a substrate-pattern forming step, in which a substrate pattern is formed by etching step using the pattern that maintains the reacted portions of the thermo reactive layer as the mask. The etching may be dry etching, more specifically, the dry etching may be reactive ion etching, inductively coupled plasma, or sputter etching. The dry etching is carried out by disposing the laminate into a vacuum reactor, then allowing to stand for a while in etching gas atmosphere at certain temperature to form remaining portions.

FIG. 4D-C shows a mask-removing step, in which the mask is removed in a liquid that is not injurious to the substrate. FIG. 4D-D shows the electroforming step, in which the pattern formed on the substrate 42 after mask-removing step shown in FIG. 4D-C is electroformed, thereby to prepare the stamper of the multi-valued ROM discs.

The processes for producing a stamper shown in FIG. 4 are as follows.

Process 1: laminating step shown in FIG. 4A→irradiating step shown in FIG. 4Be developing step shown in FIG. 4C→electroforming step shown in FIG. 4D-A;

Process 2: laminating step shown in FIG. 4A→irradiating step shown in FIG. 4B→developing step shown in FIG. 4C→substrate-pattern forming step shown in FIG. 4D-B→mask-removing step shown in FIG. 4D-C;

Process 3: laminating step shown in FIG. 4A→irradiating step shown in FIG. 4B→developing step shown in is FIG. 4C→substrate-pattern forming step shown in FIG. 4D-B→mask-removing step shown in FIG. 4D-C→electroforming step shown in FIG. 4D-D.

In the process for producing a stamper of multi-valued ROM discs according to the present invention, (ii) maintaining the reacted portions, which are produced by irradiating the light, within the thermo reactive layer, and (v) removing the maintained optical absorption layer and the maintained thermo reactive layer, are carried out by wet etching. The wet etching may be performed by dipping the material into one selected from aqueous acidic solutions, aqueous alkaline solutions, and organic solvents. Dipping the material into the etching solution for a period may bring about solving the portions other than the portions reacted due to optical irradiation and maintaining the reacted portions. The wet etching may lead to the production of multi-valued ROM pit pattern without utilizing expensive vacuum apparatuses.

Preferably, the mixture of materials A and B is employed for the thermo reactive layer, and the material A is silicon oxide so as to be suited to the wet etching, and the etching solution is an aqueous solution containing hydrofluoric acid. The aqueous solution containing hydrofluoric acid can dissolve silicon oxide selectively. The silicon oxide, material A, dissolves at the portions non-irradiated by laser beam. The material B can separate from the condition mixed with material A due to dissolution of material A. The portions reacted by laser irradiation can represent higher etching resistance against the aqueous solution containing hydrofluoric acid due to the densification and composition alteration described above, therefore, the portions reacted by laser irradiation can remain after the etching step. Further, the optical absorption layer typically exhibits significantly high etching resistance against the aqueous solution containing hydrofluoric acid. Accordingly, the optical absorption layer can act as an etching-stopping layer in the etching step, and reacted portions can be formed uniformly owing to the etching-stopping layer, even in laminates having larger surface area.

In the process for producing a stamper of multi-valued ROM discs according to the present invention, (iii) maintaining the optical absorption layer under the reacted portions, and (iv) maintaining the substrate under the reacted portions, are carried out by a dry etching.

Examples of the dry etching methods include reactive ion etching, inductively coupled plasma, and spattering etching. The dry etching is carried out by disposing the laminate into a vacuum reactor, then allowing to stand for a while in etching gas atmosphere at certain temperature, thereby to transfer the pattern on the substrate while suppressing the shrink of fine columns.

Preferably, a semiconductor laser such as GaN-based semiconductors is utilized for the laser source in the laser irradiating step. Preferably, the wavelength of the semiconductor laser is 370 to 780 nm, more preferably is 390 to 410 nm. Semiconductor lasers may lead to inexpensive laser irradiating apparatuses and lower process cost. Further, semiconductor lasers can modulate power level of laser beam rapidly, therefore, the reacted portions can be produced rapidly for laminates with higher surface area. Further, lasers with shorter wavelength may form fine laser spots, thereby fine reacted portions may be formed.

Preferably, the laminate is rotated while irradiating a laser beam onto the laminate. More preferably, the laminate is rotated while being subjected to focus servo and laser irradiation, or the laminate is rotated while being subjected to focus servo as well as tracking servo and laser irradiation. Rotation of laminates at high speed while rotating laser irradiation may lead to producing reacted potions at higher speed even in laminates with larger surface area.

Figure 5:
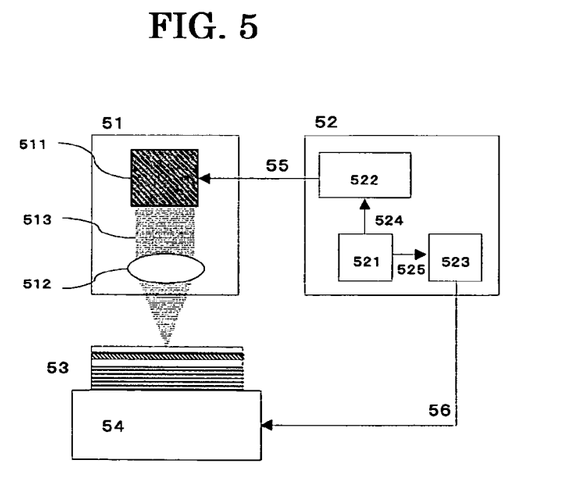
FIG. 5 is a schematic view that exemplarily shows a laser irradiating apparatus utilized for an apparatus for producing a stamper of multi-valued ROM discs according to the present invention.

FIG. 5 shows an exemplary construction of a laser irradiating apparatus, which comprises laser irradiator 51 and laser modulator 52. Laser irradiator 51 comprises semiconductor laser 511 and objective lens 512. In FIG. 5, reference number 513 indicates laser beam. The wavelength of semiconductor laser 511 is preferably 370 to 780 nm, particularly preferable is 390 to 410 nm. The NA (numerical aperture) of objective lens 512 is preferably 0.5 to 1.0, more preferably is 0.8 to 0.95.

Laser modulator 52 comprises pulse generating circuit 521, laser driving circuit 522, and reference signal generating circuit 523. Pulse generating circuit 521 generates modulating signal 524 for laser power level and also timing signal 525 for modulating. Laser driving circuit 522 generates laser driving signal 55 based on modulating signal 524 from the pulse generating circuit. Reference signal generating circuit 523 generates reference signal 56 for displacing the laminate driver based on timing signal 525 for modulating from the pulse generating circuit.

In FIG. 5, reference numbers 53 and 54 indicate the laminate and the laminate driver respectively, and laminate 53 is disposed on laminate driver 54.

The laser irradiating apparatus described above displaces the laminate while adjusting the laser irradiation based on the reference signal 56, thereby forming reacted portions on predetermined sites of the laminate.

Figure 6:
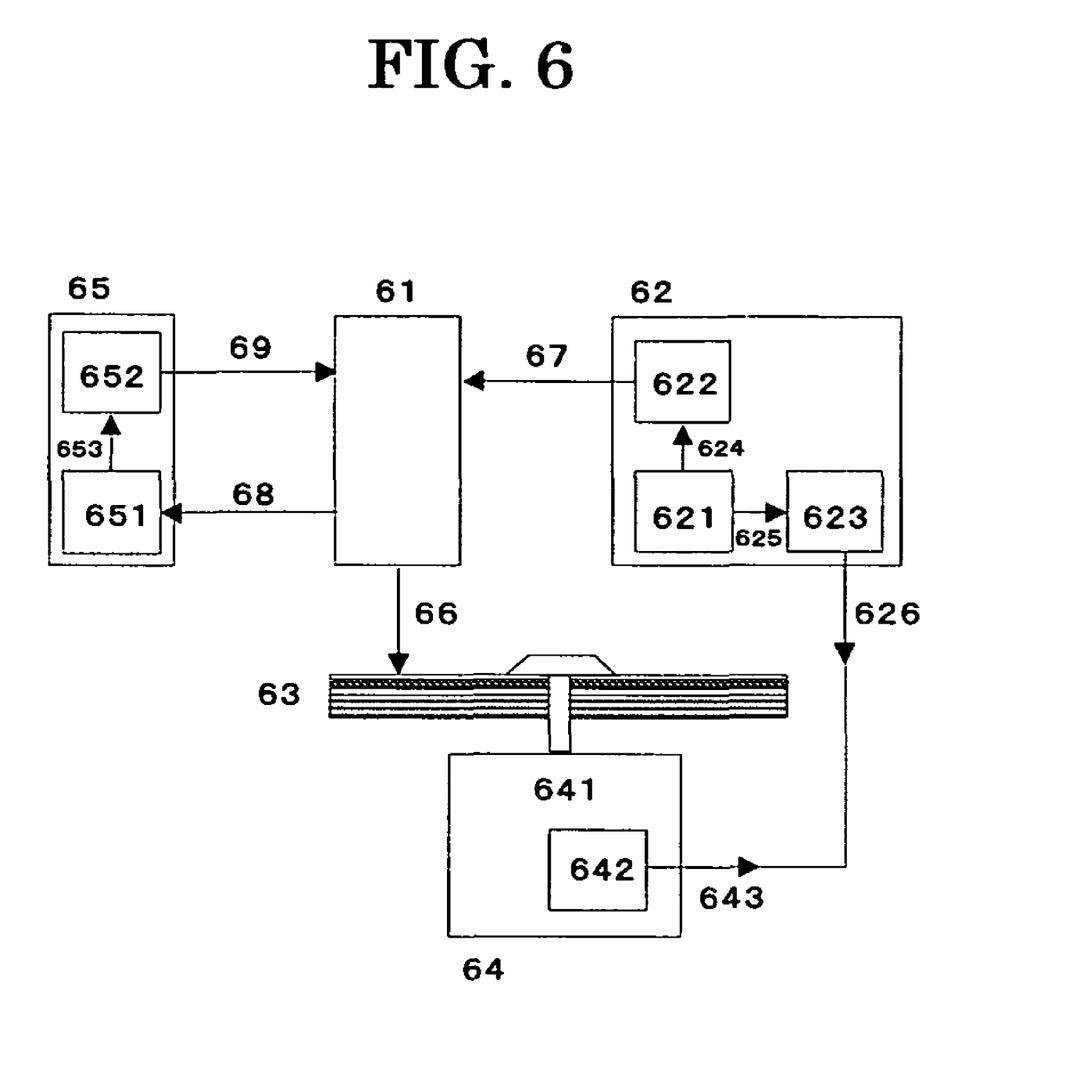
FIG. 6 is a schematic view that exemplarily shows another laser irradiating apparatus utilized for an apparatus for producing a stamper of multi-valued ROM discs according to the present invention.

FIG. 6 shows another exemplary construction of the laser irradiating apparatus, which comprises laser irradiator 61, laser modulator 62, laminate rotator 64, and signal detector 65. In FIG. 6, reference numbers 63 and 66 indicate the laminate and the laser beam respectively.

Laser irradiator 61 is constructed from a laser source, an objective lens to collect laser beam, and an actuator to drive the laser irradiator. The laser source may be $F_2$ laser having a wavelength of about 157 nm, ArF laser having a wavelength of about 193 nm, KrF laser having a wavelength of about 248 nm, and semiconductor lasers. NA of the objective lens is preferably 0.5 to 1.0, more preferably is 0.8 to 0.95.

Laser modulator 62 comprises pulse generating circuit 621, laser driving circuit 622, and reference signal generating circuit 623. Pulse generating circuit 621 generates modulating signal 624 for laser power level and also timing signal 625 for modulating. Laser driving circuit 622 generates laser driving signal 67 based on modulating signal 624 from the pulse generating circuit. Reference signal generating circuit 623 generates pulse reference signal 626 based on timing signal 625 for modulating from the pulse generating circuit.

Laminate rotator 64 comprises spin stand 641 to rotate the laminate and reference signal generating circuit 642. Reference signal generating circuit 642 generates rotation reference signal 643, and rotates the spin stand by frequency synchronizing of pulse reference signal 626 and rotation reference signal 643.

Laser beam detector 65 is constructed from optical detector 651 and servo circuit 652. The optical detector 651 receives signal 68 from a medium and focus the laser beam, to generate track error signal 653. Servo circuit 652 generates laser irradiator driving signal 69 based on the track error signal.

The laser irradiating apparatus described above may form reacted portions at predetermined sites of laminate while rotating the laminate, focusing laser beam, and controlling track error.

Hereinafter, the present invention will be described specifically by way of examples, but it should be understood that the present invention is not limited thereto.

EXAMPLE 1

-Process for Producing Stamper of Multi-Valued Discs-
<Laminate>

The laminate was produced that was formed from optical absorption layer 12 and thermo reactive layer 13 as shown in FIG. 3A by a spattering method. The layer properties, materials, and the like are shown in Table 1.

TABLE 1

| Layer Property | Material | Thickness | Spattering Target | Atmosphere | Vacuum Level | RF Power |
|---|---|---|---|---|---|---|
| Thermo Reactive layer | ZnS—SiO$_2$ | 80 nm | ZnS—SiO$_2$ | Ar | 0.13 Pa | 1.5 kW |
| Optical Absorption Layer | GeSbTe | 10 nm | GeSbTe | Ar | 0.13 Pa | 0.4 kW |
| Support | Glass | 0.6 mm | — | — | — | — |

<Laser Irradiation>

The reacted portions were formed by irradiation of laser beam as shown in FIG. 4B and developing as shown in FIG. 4C. In the irradiation of laser beam, the laser irradiating apparatus as shown in FIG. 6 was utilized, in which laser irradiator 61 comprised a semiconductor laser, the wavelength of the laser beam was 405 nm, and the NA of the objective lens was 0.9.

Figure 9:
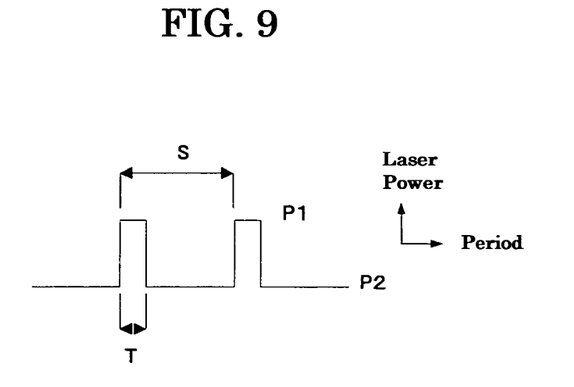
FIG. 9 is a schematic view that exemplarily illustrates a process for modulating laser beam in Example 1.

The laser beam was irradiated in the following conditions: the laser beam was irradiated toward the thermo reactive layer of laminate as shown in FIG. 3A; the laser beam was subjected to pulse modulation as shown in FIG. 9 by means of laser modulator 62; as for the power levels, P1 was 1 mW, and P2 was 0.1 mW; pulse length T was adjusted to seven levels within the range of 25 to 33.4 nsec; the pulse cycle S was 240 nsec; the medium was rotated by rotator 64; and the rotating rate was 1.0 m/sec.

As a result, column-like reacted portions were formed into the thermo reactive layer of ZnS—SiO$_2$, which corresponded to an eight-valued ROM pit pattern including no-pit.

<Developing>

The developing shown in FIG. 4C was carried out by a wet etching method. The etching liquid was hydrogen fluoride (HF) aqueous solution (HF:H$_2$O=1:2), in which the medium was immersed for 10 seconds. After the etching by the HF aqueous solution, column-like reacted portions remained in the thermo reactive layer that had seven levels of diameter size in the range of 80 to 230 nm. The relation between the pulse lengths and the diameters of remaining column-like reacted portions are shown in Table 2.

TABLE 2

| Multi-Valued Level | Pulse length (nsec) | Column Diameter (nm) |
|---|---|---|
| 1 | 25 | 80 |
| 2 | 27 | 120 |
| 3 | 28.8 | 148 |
| 4 | 30.3 | 173 |
| 5 | 31.4 | 193 |
| 6 | 32.4 | 214 |
| 7 | 33.1 | 230 |

<Electroforming>

Ni thin film of 100 nm thick was formed on the thermo reactive layer, in which the column-like reacted portions being maintained, by vacuum vapor deposition method; then through subjecting Ni thin film to Ni electroforming, a stamper of multi-valued ROM discs was prepared in a form of metal stamper.

EXAMPLE 2

-Process for Producing Stamper of Multi-Valued Discs-

A stamper of multi-valued discs was prepared in the same manner as Example 1, except that pattern-forming and mask-removing were carried out as follows; namely, laminate forming, laser irradiation, and developing were same as Example 1.

<Pattern Forming>

The etching was carried out by a reactive ion etching method in the etching step as shown in FIG. 4D-B. A mixed etching gas of CF$_4$ and Ar was employed, wherein the CF$_4$ gas being typically effective for etching of oxides, and Ar gas being intended for presenting etching anisotropy. The pressure of the mixed gas was 0.13 Pa at the etching, and the supplied energy was 200 W.

As a result, the optical absorption layer was removed mainly by Ar ion through the sputtering etching; and the glass substrate was removed mainly by the chemical reaction with CF$_4$ gas. When the etching was stopped at the point that the glass was etched 45 nm, it was confirmed that a multi-valued ROM pattern of 45 nm height was transferred on the glass substrate.

<Mask Removing>

The etching mask that was formed from column-like reactive portions of remaining thermo reactive layer and optical absorption layer were removed by immersing it into an aqueous hydrogen chloride solution. The glass substrate remaining after removing the mask was utilized for the glass stamper of multi-valued ROM discs, consequently, a polycarbonate resin could be molded directly by utilizing the glass stamper.

EXAMPLE 3

-Process for Producing Stamper of Multi-Valued Discs-

A stamper of multi-valued discs was prepared in the same manner as Example 2, except that electroforming was carried out as follows: laminate forming, laser irradiation, developing, and mask removing were the same as Example 1.

<Electroforming>

A Ni thin film of 100 nm thick was prepared on a glass substrate, to which a multi-valued ROM pattern had been transferred, by a vacuum deposition method. Using the Ni thin film as the original plate, a metal stamper was produced by Ni electroforming.

INDUSTRIAL APPLICABILITY

In accordance with the processes for producing a stamper, since fine pits can be formed by optical energy and developing without electron beam, stampers for multi-valued ROM discs can be produced inexpensively. In particular, the laminate configuration of the optical absorption layer and the thermo reactive layer being separated on the substrate can make thinner the layer capable of absorbing optical energy and generating thermal energy, and the laminate configuration of thinned layers can suppress the thermal diffusion, thereby resulting in reacted portions with fine and precise dimension.

The invention claimed is:

1. A process for producing a stamper, comprising:
   irradiating a light onto a laminate, thereby causing a reaction due to the irradiation; and
   forming a pattern of the stamper,
   wherein the laminate comprises an optical absorption layer and a thermo reactive layer on a substrate, the optical absorption layer and the thermo reactive layer being disposed adjacently,
   wherein the reaction is induced within the thermo reactive layer, thereby producing a pattern of reacted portions within the thermo reactive layer,
   wherein the thermo reactive layer comprises a mixture of material A and material B, the material A comprising silicon oxide, and the material B comprising a compound selected from sulfide compounds, selenide compounds, and fluoride compounds,
   wherein the pattern of the stamper is formed by making use of the pattern of the reacted portions, and
   wherein the stamper is utilized for producing multi-valued ROM discs.

2. The process for producing a stamper according to claim 1, wherein the pattern of the stamper is formed by developing which makes use of the difference of etching rate between the reacted portions and unreacted portions of the thermo reactive layer.

3. A process for producing a stamper, comprising:
   (i) irradiating a light onto a laminate comprising a thermo reactive layer and an optical absorption layer on a substrate, thereby producing reacted portions within the thermo reactive layer;
   (ii) developing the thermo reactive layer, thereby removing unreacted portions of the thermo reactive layer, while maintaining the reacted portions within the thermo reactive layer;
   (iii) etching exposed portions of the optical absorption layer, while maintaining portions of the optical absorption layer under the reacted portions within the thermo reactive layer;
   (iv) etching exposed portions of the substrate, while maintaining portions of the substrate under the reacted portions within the thermo reactive layer; and
   (v) removing the maintained portions of the optical absorption layer and the maintained portions of the thermo reactive layer,
   wherein the optical absorption layer and the thermo reactive layer are disposed adjacently, and the stamper is utilized for producing multi-valued ROM discs, and
   wherein the thermo reactive layer comprises a mixture of material A and material B, the material A comprising silicon oxide, and the material B comprising a compound selected from sulfide compounds, selenide compounds, and fluoride compounds.

4. The process for producing a stamper according to claim 1, wherein the light is a laser beam.

5. The process for producing a stamper according to claim 4, wherein the laser source of the laser beam is a semiconductor laser source.

6. The process for producing a stamper according to claim 3, wherein the developing of the thermo reactive layer, thereby removing unreacted portions of the thermo reactive layer, while maintaining the reacted portions within the thermo reactive layer is performed by a wet etching method.

7. The process for producing a stamper according to claim 3, wherein the etching of the exposed portions of the optical absorption layer, while maintaining the portions of the optical absorption layer under the reacted portions within the thermo reactive layer is performed by a dry etching method.

8. The process for producing a stamper according to claim 3, wherein the etching of the exposed portions of the substrate, while maintaining the portions of the substrate under the reacted portions within the thermo reactive layer is performed by a dry etching method.

9. The process for producing a stamper according to claim 3, wherein the removing of the maintained portions of the optical absorption layer and the maintained portions of the thermo reactive layer is performed by a wet etching method.

10. The process for producing a stamper according to claim 1, wherein the thermo reactive layer is transparent to the irradiated light.

11. The process for producing a stamper according to claim 1, wherein the thermo reactive layer is the uppermost layer of the laminate.

12. The process for producing a stamper according to claim 1, wherein the light is irradiated toward the thermo reactive layer.

13. An apparatus for producing a stamper of multi-valued ROM discs, wherein the apparatus comprises a semiconductor laser irradiating unit, and wherein the apparatus is utilized in a process for producing a stamper, and wherein the process comprises:
   irradiating a light onto a laminate, thereby causing a reaction due to the irradiation; and
   forming a pattern of the stamper,
   wherein the laminate comprises an optical absorption layer and a thermo reactive layer on a substrate, the optical absorption layer and the thermo reactive layer being disposed adjacently,
   wherein the reaction is induced within the thermo reactive layer, thereby producing a pattern of reacted portions within the thermo reactive layer, wherein the thermo reactive layer comprises a mixture of material A and material B, the material A comprising silicon oxide, and the material B comprising a compound selected from sulfide compounds, selenide compounds, and fluoride compounds, wherein the pattern of the stamper is formed by making use of the pattern of the reacted portions, and wherein the stamper is utilized for producing multi-valued ROM discs.

14. The process for producing a stamper according to claim 3, wherein the light is a laser beam.

15. The process for producing a stamper according to claim 14, wherein the laser source of the laser beam is a semiconductor laser source.

16. The process for producing a stamper according to claim 3, wherein the thermo reactive layer is transparent to the irradiated light.

17. The process for producing a stamper according to claim 3, wherein the thermo reactive layer is the uppermost layer of the laminate.

18. The process for producing a stamper according to claim 3, wherein the light is irradiated toward the thermo reactive layer.

19. An apparatus for producing a stamper of multi-valued ROM discs, wherein the apparatus comprises a semiconductor laser irradiating unit, and wherein the apparatus is utilized in a process for producing a stamper, and wherein the process comprises:

(i) irradiating a light onto a laminate comprising a thermo reactive layer and an optical absorption layer on a substrate, thereby producing reacted portions within the thermo reactive layer;

(ii) developing the thermo reactive layer, thereby removing unreacted portions of the thermo reactive layer, while maintaining the reacted portions within the thermo reactive layer;

(iii) etching exposed portions of the optical absorption layer, while maintaining portions of the optical absorption layer under the reacted portions within the thermo reactive layer;

(iv) etching exposed portions of the substrate, while maintaining portions of the substrate under the reacted portions within the thermo reactive layer; and (v) removing the maintained portions of the optical absorption layer and the maintained portions of the thermo reactive layer, wherein the optical absorption layer and the thermo reactive layer are disposed adjacently, and the stamper is utilized for producing multi-valued ROM discs, and wherein the thermo reactive layer comprises a mixture of material A and material B, the material A comprising silicon oxide, and the material B comprising a compound selected from sulfide compounds, selenide compounds, and fluoride compounds.

* * * * *